United States Patent [19]

Kehnemuyi et al.

[11] Patent Number: 4,975,841
[45] Date of Patent: Dec. 4, 1990

[54] METHOD AND APPARATUS FOR REPORTING CUSTOMER DATA

[75] Inventors: Craig R. Kehnemuyi; John Hughes, both of Arlington Heights, Ill.

[73] Assignee: American Colloid Company, Arlington Heights, Ill.

[21] Appl. No.: 463,819

[22] Filed: Jan. 16, 1990

Related U.S. Application Data

[63] Continuation of Ser. No. 318,680, Mar. 3, 1989, abandoned.

[51] Int. Cl.⁵ ............................................. G06F 15/21
[52] U.S. Cl. ........................................ 364/401; 379/93
[58] Field of Search .......................................... 364/145

[56] References Cited

U.S. PATENT DOCUMENTS

| 4,554,418 | 11/1985 | Toy | 364/900 |
| 4,766,542 | 8/1988 | Pilarczyk | 364/401 |
| 4,797,911 | 1/1989 | Szlam et al. | 379/67 |

OTHER PUBLICATIONS

"Off-Peak Service Streamlines Communications", *Infosystems*, 4-1980, p. 88.
Bencin, "Making the Sale with Telemarketing", *Telephony*, vol. 209, No. 24, dec. 1985, p. 56.
Bruckert et al., "Text-to Speech Unit Simplifies Interface for Computer Interaction", *Computer Technology Review*, vol. 5, No. 4, Dec. 1985, pp. 11-18.
Bencin, "Detailing the Benefits of Computerized Telemarketing", *Direct Marketing*, vol. 49, No. 2, Jun. 1986, pp. 60-61.
Harper, "Telecommunications", *Industrial Distribution*, vol. 75, No. 7, Jul. 1986, p. 61.
McCoy, "Electronic Order Exchange Links Warehouse with Clients", *Direct Marketing*, vol. 49, No. 5, Sept. 1986, p. 64 and 66.

*Primary Examiner*—Jerry Smith
*Assistant Examiner*—David Huntley
*Attorney, Agent, or Firm*—Marshall, O'Toole, Gerstein, Murray & Bicknell

[57] ABSTRACT

Method and an apparatus are provided for automatically contacting customers and reporting customer order status data. A memory is provided for receiving and storing the customer order status information. The customer order status data includes product order information, scheduled and actual shipping dates and each customer's telephone number. A telephone dialer is provided for dialing customer telephone numbers. Customer order status data is sorted by each customer's telephone number and a sepatate customer report file is generated for facsimile transmission to each identified customer. The customer report facsimile is automatically transmitted to each of the identified customers.

4 Claims, 2 Drawing Sheets

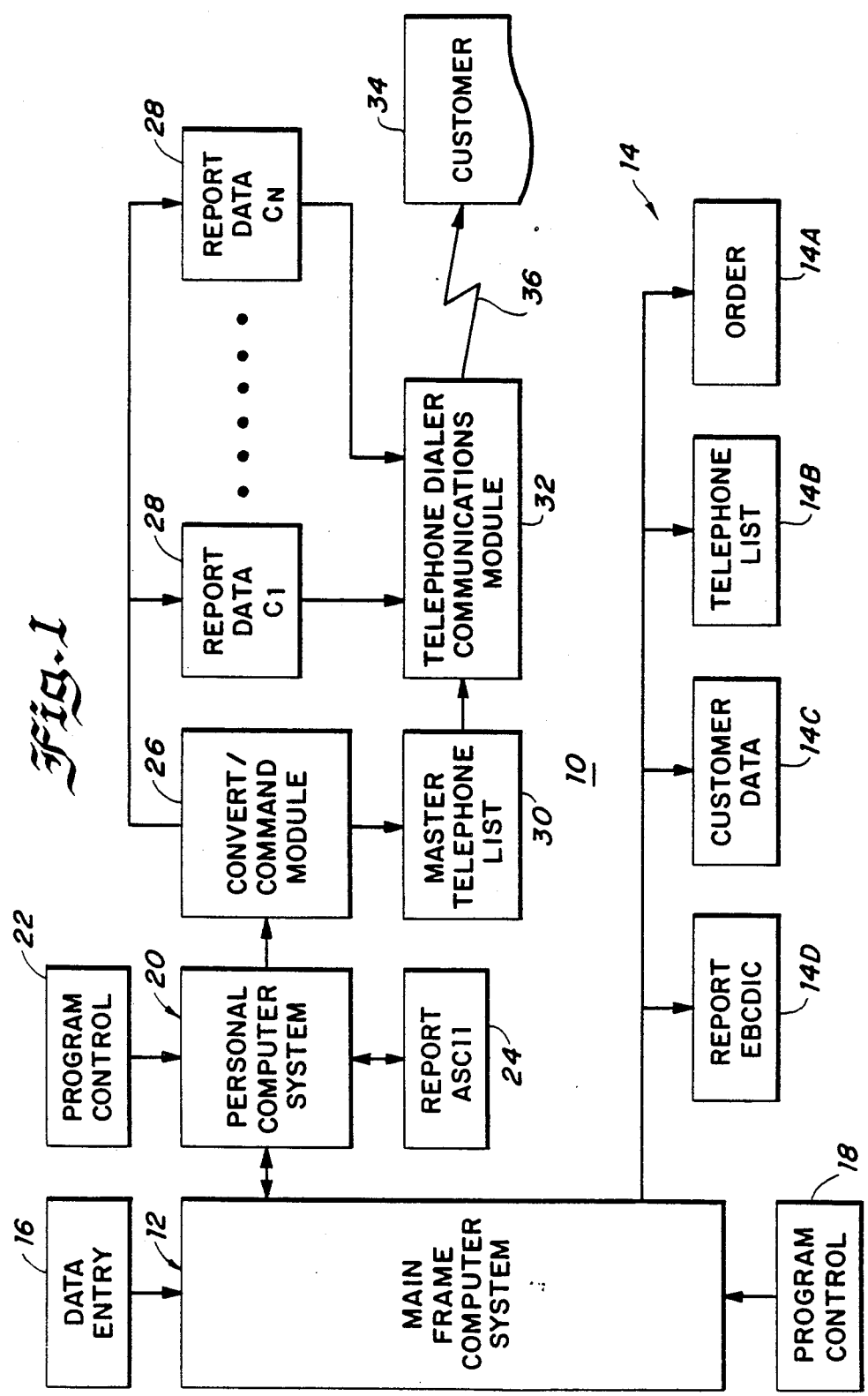

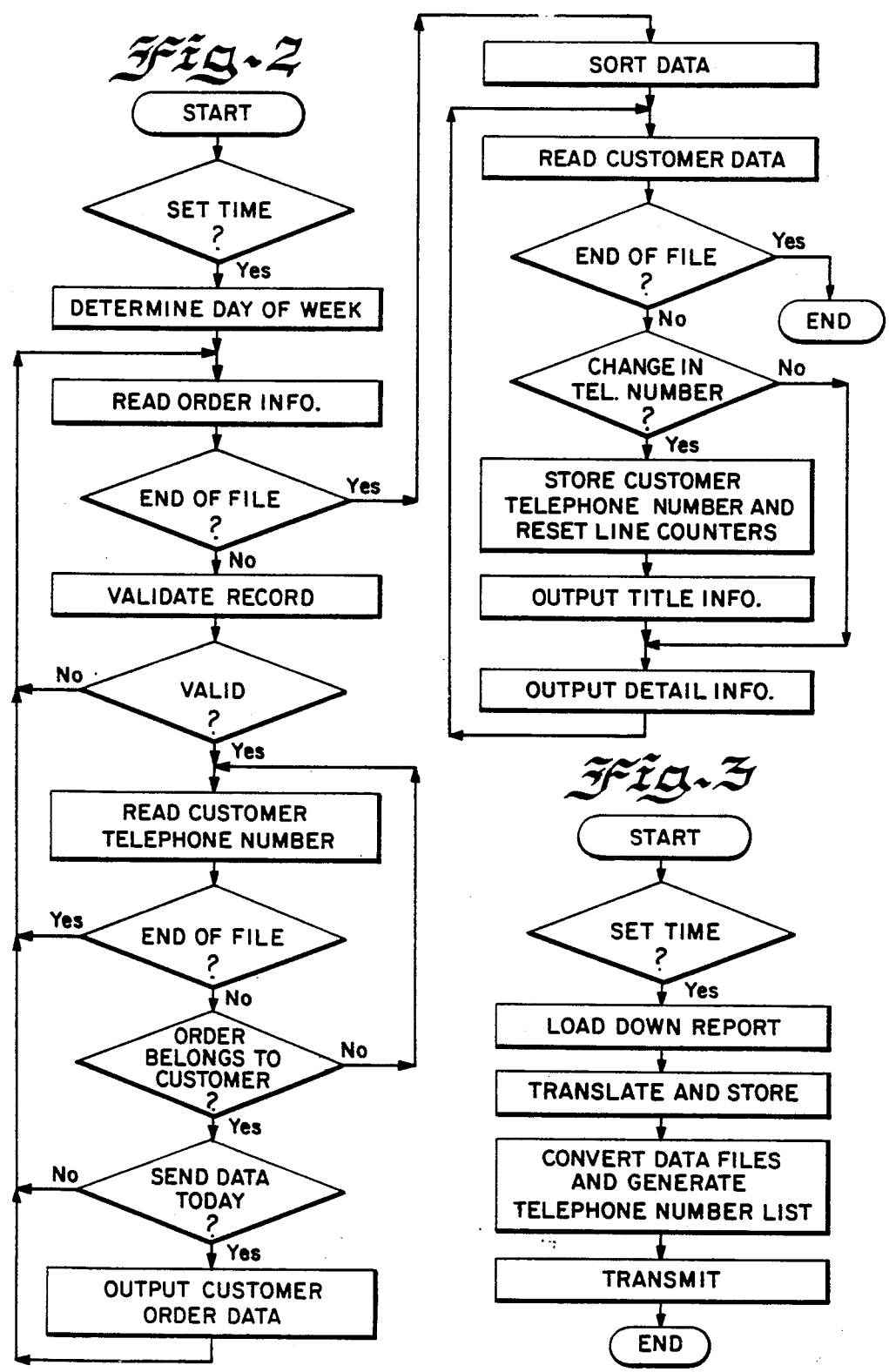

4,975,841

METHOD AND APPARATUS FOR REPORTING CUSTOMER DATA

This application is a continuation of application Ser. No. 318,680, filed Mar. 3, 1989 abandoned.

FIELD OF THE INVENTION

The present invention relates generally to a method and apparatus for reporting data, and more particularly to a method and apparatus for automatically contacting customers and reporting customer order status data by a customer location.

1. Description of the Prior Art

Various arrangements utilized for providing customers with order status information typically require significant manual operations. For example, in such arrangements that utilize a computer system for maintaining order status information, a clerk is typically required to access the computer system to collect data pertinent to a particular customer and then transmit the collected information to that customer.

It is desirable to provide a system for automatically contacting customers and reporting customer order status data.

2. Summary of the Invention

Among the principal objects of the present invention are to provide a method and an apparatus for automatically contacting customers and reporting customer order status data, providing such reported data by a customer location for each particular customer based upon stored customer information and providing such reported data at a selected predetermined periodic time interval for each customer and at a predetermined time of day.

In brief, the objects and advantages of the present invention are achieved by a method and an apparatus for automatically contacting customers and reporting customer order status data. A memory is provided for receiving and storing the customer order status information. The customer order status data includes product order information, scheduled and actual shipping dates and each customer's telephone number. A telephone dialer is provided for dialing customer telephone numbers. Customer order status data is sorted by each customer's telephone number and a separate customer report file is generated for each customer. The telephone dialer sequentially dials the customer telephone numbers and a corresponding customer report facsimile is automatically transmitted to the customer.

BRIEF DESCRIPTION OF THE DRAWINGS

The present invention together with the above and other objects and advantages may best be understood from the following detailed description of the embodiment of the invention illustrated in the drawings, wherein:

FIG. 1 is a block diagram representation of the data reporting system of the invention;

FIGS. 2 and 3 are flow charts illustrating the logical operations of the system of FIG. 1.

DETAILED DESCRIPTION OF THE PREFERRED EMBODIMENT

Referring now to the drawings, in FIG. 1 there is illustrated a block diagram representation the customer data reporting system of the present invention designated generally by the reference character 10. A main frame computer system designated by the reference character 12 includes a memory designated by the reference character 14 for receiving and storing a plurality of data files, a plurality of terminals or data entry devices (one shown) designated as 16 for entering data to the computer system 12 and a program control module 18 for storing a customer report generation and control program of the invention. The data files stored in the memory 14 include an order file 14A, a telephone list file 14B, a customer data file 14C and a customer report file 14D. The order file 14A includes data relating to products ordered including orders shipped and pending or open orders scheduled for shipment together with predefined numbers representing product codes, quantity, ship to, sold to, account and order numbers by a customer location. Order data is identified for a predetermined time period, for example, such as for 5 days prior to the current date, and utilized to generate the customer reports. The report is thus limited to current information with order data over 5 days old eliminated from the report. A facsimile transmission receiving telephone number for each customer is included in the telephone list file 14B. The customer data file 14C includes additional information by customer that may be included in the generated customer report, such as various title information. In accordance with a feature of the invention, the customer report generation and control program runs without requiring operator intervention at periodic intervals, for example, once a day, and at a predetermined time after normal business hours providing timely information to the customers and efficient data processing. The logical steps performed to generate the customer report data file stored at block 14D is illustrated and described with respect to FIG. 2.

A personal computer system designated by 20 is coupled to the main frame computer system 12 for periodically retrieving the customer data report file. The personal computer system includes a program control module 22 for storing a customer report conversion and control program of the invention illustrated and described with respect to FIG. 3. Functional blocks represented within the personal computer system 20 include a report storage block 24 for storing a translated customer report data file from the customer data report file retrieved from block 14D and a conversion and command routine block 26 programmed to generate a plurality of separate customer report data files and a command file for sending the separate customer report files by facsimile transmission to a customer location. Separate data files for each of the particular customers C1-CN included in the formatted customer report data file are stored at a plurality of blocks 28 and the command file including a master telephone list for the particular customers C1-CN is stored at a block 30. A telephone dialer and communications module 32 is coupled to command file block 30 and the customer data file blocks 28 for sequentially transmitting a facsimile document 34 for each of the customers C1-CN via a communication link 36.

Referring now to FIG. 2, there is shown a flow chart illustrating the logical steps performed by the main frame computer system 12 under the control of the customer report generation and control program module 18 in accordance with features of the invention. The sequential operations for generating the report begin at an identified predetermined set time of day. Then a determination of the current date and day of week is made. Customer order data records stored within memory block 14A are sequentially read by ship to and sold to numbers and then a validation error check is performed for each order record to determine whether the order record is valid. If the order record is not valid, then the next order record is read. The data validation error check includes the step of identifying the order records having an actual shipping date within a predefined time period. Order records having an actual shipment date earlier than the selected time period for the report, such as more than 5 days before to the current date, are eliminated by the validation error check.

Otherwise when the order record is valid, then the customer telephone list block 14B is read in order to identify and attach the facsimile transmission receiving telephone number for the particular customer to the order record. A customer validation error check is performed to determine whether the order record is for the particular customer as identified by the particular retrieved customer telephone number. This customer validation error check may include comparisons of the identified customer telephone number with sold to and ship to customer numbers. If the record order does not belong to the particular customer then a next telephone number is retrieved from the customer telephone list block 14B. The customer validation error check is repeated until a matching customer telephone number is identified or the end of the customer telephone list block 14B is reached. When a matching customer telephone number is not found, the order record is ignored or eliminated from the report being generated, and the next order record is read and the sequential steps are repeated. When a matching customer telephone number is found and attached to the data record, then a selected reporting schedule or frequency of the report is identified for the particular customer, that may be, for example, a daily report or a weekly report on a particular day of the week. If the current day is the identified scheduled reporting date for the particular customer then the data record including the customer telephone number is transferred to a temporary report file. Otherwise, when the current day is not the identified scheduled reporting date, the data record is ignored then the next order record is read and the sequential steps are repeated.

After the last of customer order data records stored within memory block 14A has been processed, the temporary report file is reorganized by sorting the customer data records by the attached customer telephone number. Next the customer data records in the reorganized report file are sequentially read. At each occurrence of a change in telephone number, the customer telephone number is stored and data line counters are reset. Report title information is identified by the customer telephone number from the customer data block 14C and transferred to the report block 14D. Then customer data records are sequentially transferred to the report block 14D in a predefined format corresponding generally to the desired printed output for each facsimile customer report document 34. Line counters are incremented corresponding to the numbers of the stored title lines, subtitle lines and customer data records used for formatting multiple page reports.

Referring now to FIG. 3, there is shown a flow chart illustrating the logical steps performed by the personal computer 20 under the control of the customer report conversion and control program module 22 in accordance with features of the invention. At an identified predetermined set time selected sufficiently later than the starting time for program module 18, the personal computer 20 accesses the main frame computer system 12 to retrieve the generated customer report file stored at block 14D. As part of the file transfer request, the downloaded report file is translated from an extended binary coded decimal interchange code (EBCDIC) used on the main frame computer 12 to an American standard code for information interchange (ASCII) and stored at the report block 24.

Next a conversion routine represented by functional block 26 is performed. The stored ASCII report file is parsed into a variable number of separate customer data files C1-CN represented by storage blocks 28, identified by each customer telephone number included in the stored report file at block 24. The conversion routine also generates a command file including a corresponding telephone list for sending the separate customer data files C1-CN by facsimile transmission. The telephone dialer communications module 32 sequentially dials the customer locations of the telephone list and sends the customer data report file.

While the invention has been described with reference to details of the illustrated embodiment, these details are not intended to limit the scope of the invention as defined in the appended claims.

We claim:

1. A method of reporting order status to a plurality of customers wherein orders for products are placed by the customers prior to a certain time and wherein data relating to each order is stored in a memory as a record indicating date of the order, actual shipping date if the product requested by the order was shipped by the certain time, customer name and acceptable days of the week on which a report may be sent to the customer who placed the order and wherein a plurality of customer telephone numbers are stored in the memory separately from the records, the method comprising the steps of:
   (a) ascertaining after the certain time a current date and current day of the week;
   (b) determining which records have actual shipping dates within a certain number of days of the current date;
   (c) comparing the data of each record with the plurality of customer telephone numbers so as to associate particular customer telephone numbers with particular determined records;
   (d) identifying which particular determined records include data specifying that the current day of the week is an acceptable day on which a report may be sent;
   (e) sorting the particular determined and identified records by customer telephone number to obtain a record sequence;
   (f) using a telephone dialer to dial a first telephone number associated with a first record in the record sequence over a telephone line;
   (g) transmitting over the telephone line at least a portion of the data of the first record after the first telephone number is dialed;
   (h) using the telephone dialer to dial a next telephone number associated with a next record in the record sequence over the telephone line;
   (i) transmitting over the telephone line at least a portion of the data of the next record after the next telephone number is dialed; and
   (j) repeating steps (h) and (i) until all remaining telephone numbers associated with the remaining records in the record sequence have been dialed and at least portions of all remaining records in the record sequence are transmitted over the telephone line.

2. The method of claim 1, wherein each of the steps (g) and (i) includes the step of sending data by facsimile transmission.

3. The method of claim 1, wherein the steps (a)–(e) are automatically undertaken by a main frame computer and the steps (f)–(j) are automatically undertaken by a personal computer.

4. The method of claim 3, wherein the main frame computer automatically undertakes the steps (a)–(e) at a first particular time of day and the personal computer automatically undertakes the steps (f)–(j) at a second particular time of day subsequent to the first particular time.

* * * * *